Figure 1:
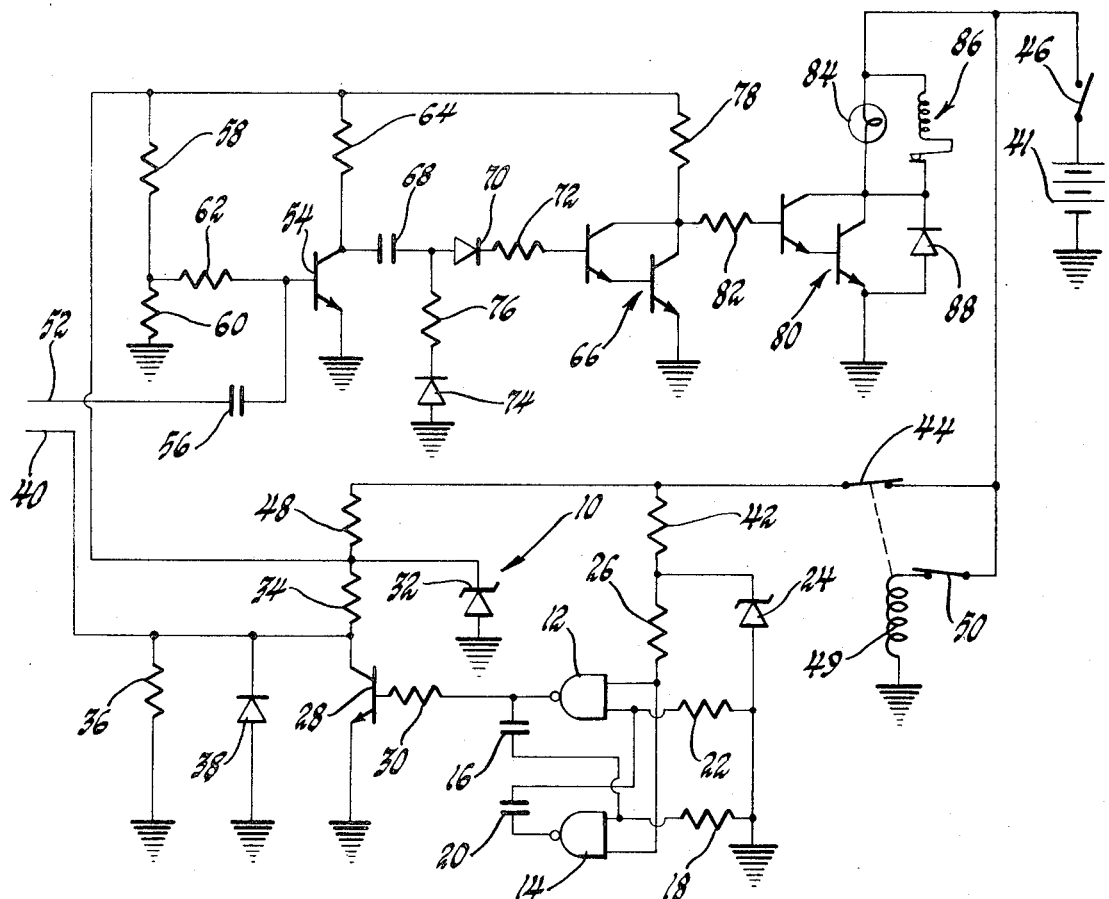

United States Patent
Robbins et al.

[11] 3,727,181
[45] Apr. 10, 1973

[54] VEHICLE SEAT OCCUPANT SENSOR

[75] Inventors: Samuel B. Robbins, Rochester; Yoshitaka Yoshida, Warren, both of Mich.

[73] Assignee: General Motors Corporation, Detroit, Mich.

[22] Filed: Jan. 31, 1972

[21] Appl. No.: 222,180

[52] U.S. Cl. ................................. 340/52 E, 340/278
[51] Int. Cl. ................................................. G08b 21/00
[58] Field of Search .................. 340/52 R, 52 E, 278, 340/258; 307/10 SB

[56] References Cited

UNITED STATES PATENTS 3,439,358    4/1969    Salmons .................. 340/278 UX

*Primary Examiner*—Alvin H. Waring
*Attorney*—C. R. Meland et al.

[57] ABSTRACT

An antenna embedded in the seat of a vehicle is coupled to the output of an oscillator to generate an electromagnetic field having a frequency at which the electromagnetic field is absorbed by a vehicle occupant when in the field. A receiving antenna is positioned within the generated electromagnetic field and is coupled to a detector. An indicator is coupled to the detector to indicate the presence of an occupant in the seat when the intensity of the electromagnetic field in proximity to the receiving antenna decreases due to absorption of the electromagnetic field by an occupant in the seat.

3 Claims, 2 Drawing Figures

VEHICLE SEAT OCCUPANT SENSOR

This invention relates to an apparatus for providing an indication of the presence of an occupant of a vehicle seat.

Apparatus for sensing the presence of a vehicle seat occupant has usually taken the form of a mechanical switch which is actuated by the weight of the occupant in the seat. In contrast, it is the general object of this invention to provide an apparatus for electronically sensing the presence of an occupant in a vehicle seat.

Another object of this invention is to provide an apparatus for sensing the presence of a vehicle seat occupant, which apparatus does not have moving parts and which is not weight responsive.

It has been known fr some time that the human body absorbs electromagnetic radiation, the magnitude of absorption being greater at certain frequencies than at other frequencies. By using this phenomena, the foregoing objects are accomplished by generating an electromagnetic field by an antenna embedded under the surface of the seat normally occupied by an occupant and an oscillator coupled thereto which oscillates at a frequency for generating an electromagnetic field having a frequency at which the field is readily absorbed by a human body. A receiving antenna is also embedded in the seat within the electromagnetic field and is coupled to a detector. The detector generates a signal related to the intensity of the electromagnetic field in the proximity of the receiving antenna. In the absence of a human body, the signal at the output of the detector is above a predetermined threshold and in the presence of a human on the seat, the output of the detector is below the threshold due to the absorption of the electromagnetic field by the occupant. An indicator is then responsive to the output of the detector for providing an indication of the presence of a vehicle seat occupant.

Figure 2:
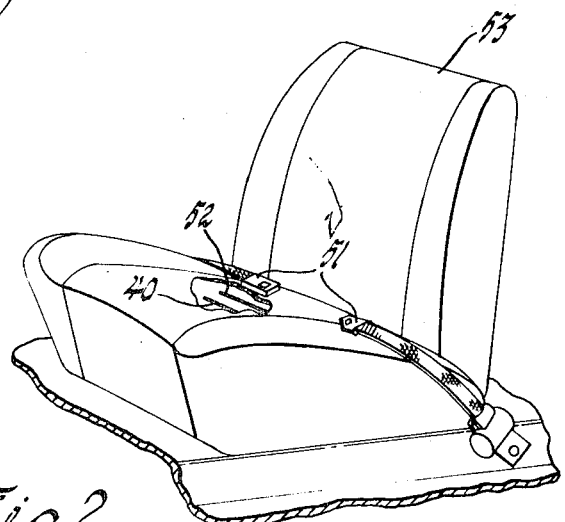

The invention may be best understood by reference to the following description of a preferred embodiment and the drawings in which:

FIG. 1 is an electrical schematic of the preferred embodiment of this invention; and FIG. 2 is a schematic drawing of a vehicle seat with the location of the antennas used in the electrical schematic of FIG. 1.

Referring to FIG. 1, an oscillator 10 is comprised of a logical NAND gate 12 and a logical NAND gate 14, the output of the NAND gate 12 being coupled to ground through a capacitor 16 and a resistor 18 and also coupled to an input of the NAND gate 14 through the capacitor 16 and the output of the NAND gate 14 being coupled to ground through a capacitor 20 and a resistor 22 and also coupled to an input of the NAND gate 12 through the capacitor 20. The NAND gate 12 and the NAND gate 14 each has a second input coupled to the cathode of a Zener diode 24 through a resistor 26. The output of the NAND gate 12 is coupled to the base electrode of an output transistor 28 through a resistor 30. The emitter electrode of the transistor 28 is coupled to ground and the collector electrode thereof is coupled to the cathode of a Zener diode 32 through a resistor 34. The collector electrode of the transistor 28 is also coupled to ground through a resistor 36 and is connected to the cathode of a diode 38 whose anode is connected to ground. The output of the oscillator 10 is supplied from the collector electrode of the transistor 28 to an electrical conductor 40 which forms an antenna. The cathode of the Zener diode 24 is coupled to the positive terminal of a DC power source 41, which may be the vehicle battery, through a current limiting resistor 42, a set of normally open relay contacts 44 and the ignition switch 46. The cathode of the Zener diode 32 is coupled to the positive terminal of the DC power source 41 through a current limiting resistor 48, the set of normally open relay contacts 44 and the ignition switch 46. The set of normally open relay contacts 44 are closed upon the energization of a relay coil 49 through a normally closed microswitch 50 which is connected between the relay coil 49 and the ignition switch 46. The microswitch 50 is operatively associated with a set of seat belt members 51 (FIG. 2) so as to be opened whenever the members 51 are buckled. An example of such a switch is shown in U.S. Pat. No. 3,449,714 Farley, Jr., which issued on June 10, 1969, and is assigned to the assignee of this invention.

Upon the closure of the vehicle ignition switch 46, the oscillator 10 oscillates if the set of normally open relay contacts 44 are closed by the energization of the relay coil 49 through the microswitch 50 to supply a signal to the antenna 40 which generates an electromagnetic field having a frequency equal to the frequency of oscillation of the oscillator 10. The time constants of the oscillator 10 are chosen so that the frequency of oscillation thereof is equal to a frequency at which the electromagnetic field is readily absorbed by the human body. Tests have shown that the human body will absorb an electromagnetic field oscillating at a frequency of 2 mhz. It is understood that the invention is not limited to this frequency but may be any frequency at which the electromagnetic field is absorbed by the human body. Referring to FIG. 2, the antenna 40 and a receiving antenna 52 are embedded under the surface of a vehicle seat 53 in the area normally occupied by an occupant. It is not required that the antenna 40 and the recieving antenna 52 be embedded in the seat 53. It is sufficient that they be carried in some manner by the seat 53.

Referring again to FIG. 1, the antenna 52 is connected to the base electrode of a transistor 54 through a coupling capacitor 56. A voltage divider comprised of a resistor 58 and a resistor 60 is connected across the Zener diode 32 and supplies from therebetween a biasing voltage to the base electrode of the transistor 54 through a resistor 62. The collector electrode of the transistor 54 is connected to the cathode of the Zener diode 32 through a resistor 64 and the emitter electrode thereof is connected to ground. The transistor 54 is biased into class A or class B operation by the resistors 58, 60 and 62 and serves as a detector for the antenna 52. When the transistor 54 is biased less conductive, a positive current pulse is supplied to the base of an NPN Darlington amplifier 66 through a capacitor 68, a diode 70 and a resistor 72. When the transistor 54 is biased more conductive, the capacitor 68 discharges from ground through a diode 74, a resistor 76 and the transistor 54. The collector electrode of the Darlington amplifier 66 is connected to the cathode of the Zener diode 32 through a resistor 78 and the emitter electrode thereof is connected to ground. The output of the Darlington amplifier 66 at the collector electrode thereof is supplied to the base electrode of an NPN Darlington amplifier 80 through a resistor 82. The emitter electrode of the Darlington amplifier 80 is connected to ground and the collector electrode thereof is connected to the positive terminal of the DC power source 41 through an indicator light 84 and the ignition switch 46. The collector electrode is also connected to the positive terminal of the DC power source 41 through a buzzer 86 and the ignition switch 46. The Darlington amplifiers 66 and 80, the light 84, buzzer 86 and associated circuitry form an indicator which is coupled to the transistor 54 which forms a detector.

The Darlington amplifier 66 is incapable of tracking a signal at the high frequency of the output signal of the oscillator 10. Consequently, when the amplitude of the positive pulses supplied thereto through the capacitor 68 exceeds a certain threshold, the Darlington amplifier 66 switches from a nonconductive to a conductive state. Simultaneously therewith, the Darlington amplifier 80 switches from a conductive to a nonconductive state. When no person is within the proximity of the antenna 40 and the receiving antenna 52, the intensity of the electromagnetic field in the proximity of the receiving antenna 52 is such that the magnitude of the input to the Darlington amplifier 66 exceeds the threshold value to switch the Darlington amplifier 66 into a conductive state. Consequently, the Darlington amplifier 80 is in its nonconductive state and the indicator light and the buzzer 86 are deenergized. On the other hand, when a person is on the seat 53 in FIG. 2 in the proximity of the antenna 40 and the receiving antenna 52, the intensity of the electromagnetic field in the proximity of the receiving antenna 52 is decreased due to the absorption of the electromagnetic field by the person which results in a decrease in the input to the Darlington amplifier 66 below the threshold thereof. Consequently, the Darlington amplifier 66 switches from its conducting state to its nonconducting state and the Darlington amplifier 80 switches to its conducting state to energize the indicator light 84 and the buzzer 86 to provide an indication of the presence of the person on the seat 53. A diode 88 has its anode connected to ground and its cathode connected to the collector of the Darlington amplifier 80 to protect the Darlington amplifier 80 from transients caused by the buzzer 86.

The warning circuit previously discussed operates in conjunction with the normally closed seat belt microswitch 50 to perform the following function: When the occupant of the seat 53 in FIG. 2 buckles the seat belt members thereof, the normally closed microswitch 50 is opened which results in the deenergization of the relay coil 49 and, therefore, the oscillator 10, the transistor 54 and the Darlington amplifiers 66 and 80. Consequently, the indicator light 84 and the buzzer 86 are maintained deenergized even though the occupant is within the proximity of the antenna 40 and the receiving antenna 52. On the other hand, if the seat occupant is in the proximity of the antenna 40 and the receiving antenna 52 and the seat belt members are not coupled, the circuits are energized through the set of normally open relay contacts 44 upon the closure of the ignition switch 46 and the indicator light 84 and the buzzer 86 are energized as previously described to provide the warning that the seat belt members are not coupled.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A motor vehicle seat occupant sensor comprising, in combination, means for generating in the proximity of the seat normally occupied by the occupant an electromagnetic field having a frequency of oscillation at which the electromagnetic field is absorbed by the occupant, said means including an oscillator for generating an output signal at said frequency and an electrical conductor forming an antenna coupled to the oscillator and carried by the seat in an area normally occupied by the occupant for generating the electromagnetic field having the frequency of oscillation in response to the output of the oscillator; a receiving antenna carried by the seat within the generated electromagnetic field, the electromagnetic field in proximity to the receiving antenna having an intensity greater than a threshold level in the absence of an occupant on the seat and less than the threshold level in the presence of an occupant on the seat resulting from the absorption of the electromagnetic field by the occupant; a detector coupled to the receiving antenna for generating an output signal having a magnitude related to the intensity of the electromagnetic field in proximity to the receiving antenna.

2. A motor vehicle seat occupant indicating circuit comprising, in combination, means for generating in the proximity of the seat normally occupied by the occupant an electromagnetic field having a frequency of oscillation at which the electromagnetic field is absorbed by the occupant, said means including an oscillator for generating an output signal at said frequency and an electrical conductor forming an antenna coupled to the oscillator and embedded under the surface of the seat normally occupied by the occupant for generating the electromagnetic field having the frequency of oscillation in response to the output of the oscillator; a receiving antenna embedded under the surface of the seat within the generated electromagnetic field, the electromagnetic field in proximity to the receiving antenna having an intensity greater than a threshold level in the absence of an occupant on the seat and less than the threshold level in the presence of an occupant on the seat resulting from the absorption of the electromagnetic field by the occupant; a detector coupled to the receiving antenna for generating an output signal having a magnitude related to the intensity of the electromagnetic field in proximity to the receiving antenna; and an indicator coupled to the detector for providing an indication when the magnitude of the output signal of the detector represents an electromagnetic field intensity in proximity to the receiving antenna less than the threshold level to thereby provide an indication of the presence of an occupant on the seat of the motor vehicle.

3. A motor vehicle seat occupant indicating circuit comprising, in combination, a power source; means for generating in the proximity of the seat normally occupied by the occupant an electromagnetic field having a frequency of oscillation at which the electromagnetic field is absorbed by the occupant, said means including an oscillator for generating an output signal at said frequency when coupled to the power source and an electrical conductor forming an antenna coupled to the oscillator and embedded under the surface of the seat normally occupied by the occupant for generating the electromagnetic field having the frequency of oscillation in response to the output signal of the oscillator; a receiving antenna embedded under the surface of the seat within the electromagnetic field, the electromagnetic field in proximity to the receiving antenna having an intensity greater than a threshold level in the absence of an occupant on the seat and less than the threshold level in the presence of an occupant on the seat resulting from the absorption of the electromagnetic field by the occupant; a detector coupled to the receiving antenna for generating an output signal having a magnitude related to the intensity of the electromagnetic field in proximity to the receiving antenna when coupled to the power source; an indicator coupled to the detector for providing an indication when coupled to the power source and when the magnitude of the output signal of the detector represents an electromagnetic field intensity in proximity to the receiving antenna less than the threshold level; a pair of selectively coupled or decoupled seat belt members; and a seat belt condition responsive switch coupled to the power source for coupling the power source to the oscillator, the detector and the indicator when the seat belt members are not coupled, whereby the indicator provides an indication of the failure of the vehicle seat occupant to couple the seat belt members.

* * * * *